Dec. 28, 1948.  F. L. RUPLEY  2,457,401
PNEUMATIC GAUGING APPARATUS
Filed Aug. 29, 1946  2 Sheets-Sheet 1
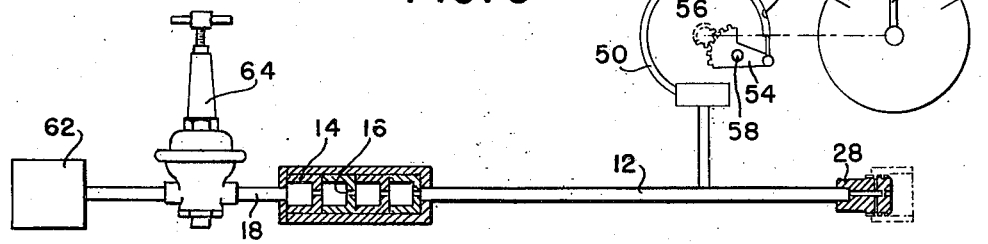
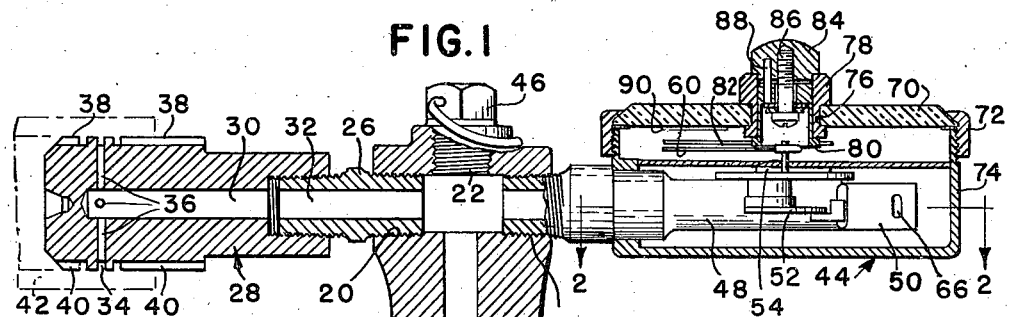
INVENTOR
FREDERICK L. RUPLEY
BY
Toulmin & Toulmin
ATTORNEY Dec. 28, 1948.  F. L. RUPLEY  2,457,401
PNEUMATIC GAUGING APPARATUS
Filed Aug. 29, 1946  2 Sheets-Sheet 2
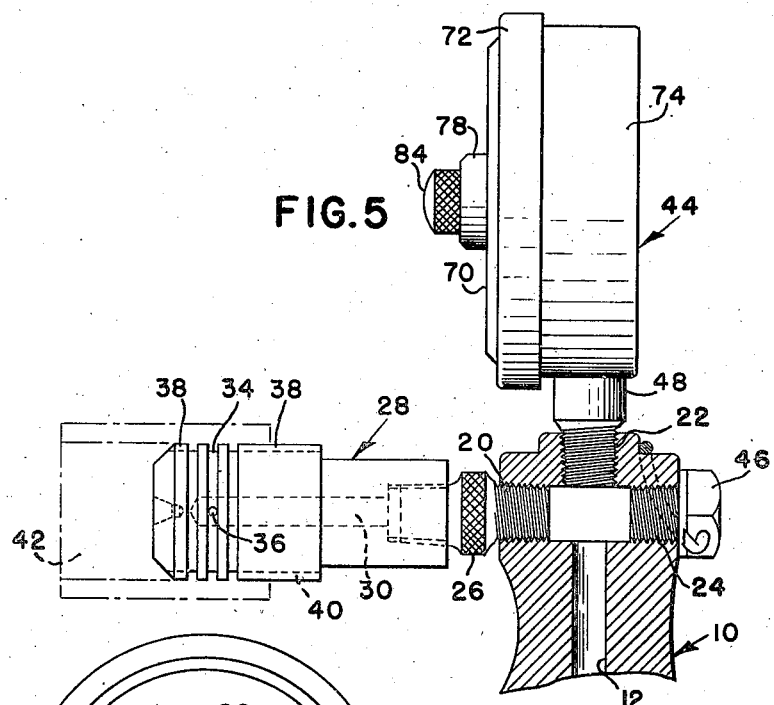
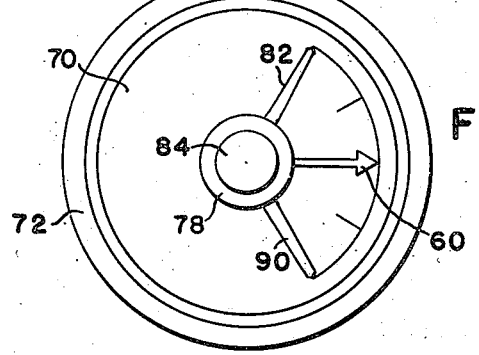
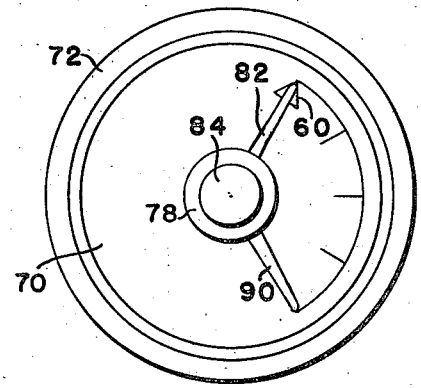
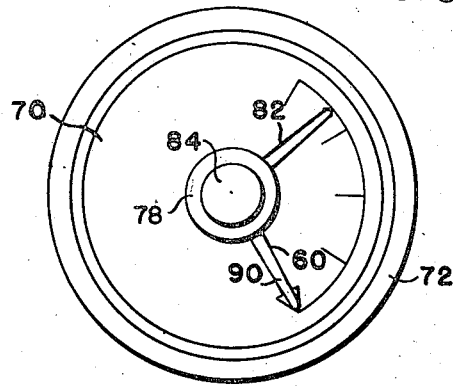
INVENTOR
FREDERICK L. RUPLEY
BY
Toulmin & Toulmin
ATTORNEY Patented Dec. 28, 1948

2,457,401

UNITED STATES PATENT OFFICE 2,457,401

PNEUMATIC GAUGING APPARATUS

Frederick L. Rupley, Cincinnati, Ohio, assignor to Merz Engineering Co., Indianapolis, Ind., a corporation of Indiana Application August 29, 1946, Serial No. 693,721

2 Claims. (Cl. 73—37.5)

This invention relates to gauging mechanisms, and particularly to gauging mechanisms employing an elastic fluid medium such as compressed air.

Manual gauges have heretofore been limited in their use because of the fixed relative locations of the gauging head and handle. Furthermore, gauges of this type were not adapted for being fixed in a machine part or on a column for use as a stationary measuring instrument. A still further weakness of gauges constructed according to the prior art lies in the fact that most thereof were pre-calibrated and were thus useful only for a limited number of different types of workpieces. In the present invention, the gauge is made universal by utilizing an indicating instrument having adjustable high and low limit indicators and a die having standard calibration. In this manner the instrument is made universal and is adaptable for a great many workpieces and gauging set-ups.

Accordingly, the principal object of the present invention is to provide a hand type air gauge which shall be substantially universal in its operation.

Another object is to provide a gauge having means whereby the gauge can readily be manipulated manually, or be clamped in a stationary member as a fixed gauge.

It is also an object of the present invention to provide an improved and novel means of indicating the high and low limits of the workpieces being measured.

These and other objects and advantages will become more apparent upon reference to the following description and the accompanying drawings in which:

Figure 1 is a vertical section through a gauge constructed according to this invention;

Fig. 2 is a plan section taken substantially on the line 2—2 of Figure 1 and indicating the internal construction of the indicating device;

Figure 3 is a diagrammatic view showing the fluid circuit of the gauge;

Figure 4 is an enlarged view of the means for setting one of the limit indicators of the gauge;

Figure 5 is a view similar to Figure 1 but showing the indicating device of the gauge mounted in another position;

Figure 6 illustrates the indicator being set for the high limit of the workpiece;

Figure 7 shows the indicator being set for the low limit;

Figure 8 shows the indicator when a workpiece of exactly the correct size is being measured; and Figure 9 is a plan section indicated by the line 9—9 on Figure 1 and shows the configuration of the gauge handle which is also employed for clamping the gauge in a fixture.

General arrangement

A gauge according to this invention comprises a member adapted for being engaged by the workpiece and which has a port therein through which fluid such as compressed air is normally exhausted to the atmosphere. When the gauge head is engaged by a workpiece, the rate of fluid discharge is varied and this variation in the rate of discharge is converted into a pressure indication on a suitable indicating instrument.

According to this invention a gauge head and indicator are carried on a gauge body which is provided with a plurality of apertures for receiving the said gauge head and indicator. The gauge body preferably includes fluid flow controlling means so that the gauging head and indicating instrument are supplied with fluid at a controlled rate and pressure.

The indicating device is preferably a pressure responsive instrument having a movable pointer thereon. For indicating the high and low limits of the workpiece the indicating instrument has a pair of adjustable indicia with which the movable pointer of the instrument registers. One of these indicia is carried on the glass of the instrument, the said glass being rotatable properly to position the indicia. The other of the indicia is carried on an angularly adjustable knob which projects through the instrument glass

Structural arrangement

Referring to the drawings more particularly, 10 indicates the body of the gauge and is axially bored as at 12. The lower end of the bore 12 receives a plurality of cup-shaped members 14 which have therein the restricted openings 16. At the extreme lower end of the body 10 there is connected the flexible conduit 18 which supplies compressed air to the bore 12.

The upper end of the body 10 terminates in a block which has a plurality of threaded apertures therein as at 20, 22 and 24. These threaded apertures all communicate with the bore 12 so as to be under the pressure of the air passing therethrough.

In one of the said apertures there is mounted a nipple or coupling 26 which screw threadedly receives at its outer end a gauging head 28. The gauging head 28 is axially bored as at 30 and communicates through the bore 32 of the nipple 26 with the bore 12. The outer end of the gauging head 28 is in the form of a cylinder and there is a peripheral groove as at 34 which communicates by the radial passages 36 with the bore 30. The head 28 has the pilot surfaces 38 on either side of the portion in which the groove 34 is located, and these pilot portions are slotted as at 40 to permit the exhaust of air from the gauging head when it is inserted in the bore of the workpiece. Such a workpiece is indicated by the dot-dash lines at 42 and it will be seen that the workpiece in cooperation with the lands on either side of the groove 34 define a flow passage from the said groove 34 to the atmosphere for the fluid passing through the gauging head.

Secured in another of the apertures, such as 24, there is an indicating instrument 44, while the third of the apertures is closed by a suitable plug as at 46.

The instrument 44 comprises a center post 48 and has attached thereto a Bourdon tube 50 which, at its free end, connects through a linkage 52 with a gear sector 54 that drives through pinion 56 and shaft 58 to the instrument pointer 60.

The fluid circuit of the gauge is diagrammatically indicated in Figure 3 wherein there is shown a source of pressure fluid at 62 which delivers through a pressure regulator 64 to the conduit 18. After the fluid passes through the apertures 16 and the members 14 it passes directly to the gauging head 28 and the Bourdon tube 50. Normally, the fluid supplied to the gauging head and instrument is substantially freely evacuated to the atmosphere through the said gauging head. However, when the flow of fluid through the gauging head is restricted by a workpiece, the pressure standing on the Bourdon tube increases and the same yields to actuate the movable pointer 60 and to give an indication of the size of the workpiece being measured.

Preferably, there is an auxiliary aperture 66 formed in the Bourdon tube itself through which a predetermined quantity of air continuously passes. Due to the flow controlling action of the regulator 64 and the members 14, complete closure of the gauging head will result in only a predetermined movement of the pointer 60 because the aperture 66 will discharge the entire fluid supply at a predetermined maximum pressure. The particular type of Bourdon tube movement including the aperture 66 is illustrated and 653,353, filed Mar. 9, 1946.

In Figure 5 there is shown a somewhat modified arrangement wherein the indicating device 44 has been placed in the aperture 22 while the aperture 24 is closed by the plug 46. It will be apparent that the instrument 44 and gauging head 28 could occupy any of several relative positions so that the instrument can be most readily observed during the gauging of a workpiece. Likewise, the gauging head and instrument can be relatively located in the gauge body in the most convenient manner for operating the gauge as a fixed device, or for clamping the gauge in a lathe compound or the like.

For the purpose of providing a ready means of manipulating the gauge and also of fixedly clamping it, the body portion is formed as in Figure 1 in a manner to be readily graspable by the gauge operator's hand. Further, the opposite sides of the gauge are flattened at 68 in Figure 9.

Referring more particularly to the indicating instrument 44, in Figures 1 and 4, it will be observed that the glass 70 of the instrument is retained in position by a bezel ring 72 which is threaded around the upper open edge of the instrument case 74. The glass 70 is centrally apertured as at 76 and receives a sleeve or bushing 78. Extending upwardly from the bottom of said bushing is an inverted cup-shaped member 80 which has attached at its lower end a pointer 82. The upper end of the sleeve 78 is closed by a knob 84 which is connected with the cup-shaped member 80 by means of a screw 86.

A dowel pin 88 extends from the knob 84 into the cup-shaped member 80 so that rotation of the said knob is effective to rotate the cup-shaped member. Preferably, the screw 86 is tightened so that the assembly is normally frictionally retained in any position of adjustment.

The under side of the glass 70 carries an indicia 90 which is preferably pointed on the said glass with a suitable permanent paint or enamel and may be of any desirable color. The painted mark 90 and the pointer 82 provide adjustable indicia which can be pre-set according to the proper high and low limit for the workpiece being gauged. Thus, when a workpiece is measured if the movable pointer 60 falls between the said indicia, the workpiece is acceptable; and, if the pointer falls beyond either of the said indicia, the workpiece is rejected as being either over-size or undersize.

The operator places on the gauging head 28 a master gauge which is formed to be exactly the size of a workpiece at the low limit thereof. With the low limit master gauge on the gauging head 28, the pointer 60 will move to the minus side of the dial of the indicating instrument to the position indicated in Figure 6.

The operator then loosens the bezel ring 72 and rotates the glass 70 until the painted mark 90 thereon exactly registers with the pointer 60. The bezel ring is then tightened while holding the glass against rotation and the mark 90 is fixed at the low limit.

The operator then removes the low limit master gauge and places on the gauging head a second master gauge formed to the size of a workpiece at its higher limit. The pointer 60 will then swing to its Figure 7 position.

Then, the pointer 82 is moved by rotating the knob 84 until the said pointer exactly aligns with the pointer 60. This fixes the upper limit of the workpiece.

Thereafter, so long as the pointer 60 falls between the indicia represented by the mark 90, and pointer 82, the workpiece is acceptable; and, if the pointer 60 moves to beyond either of the said indicia, the workpiece is rejected.

It will be apparent that the present invention provides for a gauge which is adaptable for a plurality of different types of workpieces both as a manually manipulated device and as a device to be fixed in a stationary column or in a lathe carriage or the like. The gauge body is especially adapted for rigid clamping or for being grasped in the hand.

The gauge body is further provided with a plurality of threaded ports which permit the indicator gauge head to be arranged in a plurality of different relative positions. By providing the novel means of this invention for positioning the high and low workpiece limit indicia, the gauge becomes adaptable for a plurality of different workpieces having different limits of tolerance associated therewith.

It will be understood that this invention is susceptible to modification in order to adapt it to different usages and conditions and, accordingly, it is desired to comprehend such modifications within this invention as may fall within the scope of the appended claims.

I claim:

1. In an air gauge assembly, a handle, there being a pressure supply passageway extending axially through said handle, a series of restricted orifices and expansion chambers in said passageways in said handle, means for connecting a source of air pressure to said passageway at the rear of said handle, a threaded connection at the end of said handle, a pressure gauge mounted in said connection, a radially disposed threaded connection to said passageway in said handle located adjacent the front end of said handle, and a gauge head mounted in said last named connection.

2. In a portable pneumatic gauge device, a main body comprising a handle, there being a pressure supply passageway in said handle including a series of restricted orifices and expansion chambers in said handle, means for connecting a source of air pressure through said orifices and chambers to the passageway in said handle, a coupling connection radially disposed at the end of said handle, a pressure gauge mounted in said connection, a radially disposed threaded connection to said passageway in said handle located adjacent the front end of said handle, and a gauge head mounted in said last named connection.

FREDERICK L. RUPLEY.

REFERENCES CITED

The following references are of record in the file of this patent:

UNITED STATES PATENTS

| Number | Name | Date |
|---|---|---|
| 416,594 | Goddard | Dec. 3, 1889 |
| 447,276 | Brayton | Feb. 24, 1891 |
| 1,397,518 | Hem | Nov. 22, 1921 |
| 1,497,372 | Green | June 10, 1924 |
| 1,723,390 | Tingley | Aug. 6, 1929 |
| 1,888,298 | Teesdale | Nov. 22, 1932 |
| 2,150,245 | Reinking | Mar. 14, 1939 |
| 2,191,140 | Ford | Feb. 20, 1940 |
| 2,254,259 | Aller | Sept. 2, 1941 |
| 2,358,769 | Aller | Sept. 19, 1944 |
| 2,360,705 | Moore | Oct. 17, 1944 |